(12) United States Patent
Passmore et al.

(10) Patent No.: US 11,787,304 B1
(45) Date of Patent: *Oct. 17, 2023

(54) SMART LOAD MANAGEMENT APPARATUS AND SYSTEM FOR ELECTRIC VEHICLE CHARGING

(71) Applicant: EVERCHARGE, INC., San Francisco, CA (US)

(72) Inventors: John Loren Passmore, Berkeley, CA (US); Jason Appelbaum, Oakland, CA (US)

(73) Assignee: Evercharge, Inc., San Francisco, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/398,986

(22) Filed: Aug. 10, 2021

Related U.S. Application Data

(63) Continuation of application No. 16/354,025, filed on Mar. 14, 2019, now Pat. No. 11,091,054.

(60) Provisional application No. 62/643,043, filed on Mar. 14, 2018.

(51) Int. Cl.
| | |
|---|---|
| *B60L 53/63* | (2019.01) |
| *B60L 53/14* | (2019.01) |
| *G05B 19/042* | (2006.01) |
| *B60L 53/10* | (2019.01) |
| *B60L 53/60* | (2019.01) |

(52) U.S. Cl.
CPC ............... *B60L 53/63* (2019.02); *B60L 53/10* (2019.02); *B60L 53/14* (2019.02); *B60L 53/60* (2019.02); *G05B 19/042* (2013.01); *G05B 2219/2639* (2013.01); *Y04S 10/126* (2013.01)

(58) Field of Classification Search
CPC .......... B60L 53/63; B60L 53/10; B60L 53/14; B60L 53/60; G05B 19/042; G05B 2219/2639; Y04S 10/126
See application file for complete search history.

(56) References Cited

U.S. PATENT DOCUMENTS

| | | |
|---|---|---|
| 10,183,586 B1 | 1/2019 | Appelbaum |
| 2011/0172839 A1 | 7/2011 | Brown et al. |
| 2011/0276194 A1 | 11/2011 | Emalfarb et al. |
| 2012/0206100 A1 | 8/2012 | Brown et al. |
| 2013/0049684 A1 | 2/2013 | Kusch et al. |
| 2013/0049689 A1 | 2/2013 | Hayashigawa et al. |
| 2013/0127416 A1 | 5/2013 | Kamer et al. |
| 2013/0234664 A1 | 9/2013 | Marus et al. |
| 2013/0289821 A1 | 10/2013 | Nakagawa |
| 2014/0015487 A1 | 1/2014 | Brown et al. |
| 2014/0035527 A1 | 2/2014 | Hayashigawa et al. |

(Continued)

*Primary Examiner* — Mohammad Ali
*Assistant Examiner* — Sheela Rao
(74) *Attorney, Agent, or Firm* — Renaissance IP Law Group, LLP; David A. Crowther

(57) ABSTRACT

Embodiments of the inventive concept measure the amount of electrical power being consumed in one or more houses or buildings, before the utility meter or meters. These measurements are used by a smart load manager (SLM) apparatus, in addition to information about the maximum capacity of the electrical lines that are being measured, to maximize the number of electric vehicle supply equipment (EVSE) units that can be installed in the one or more buildings, and maximize the amount of power that is available for electric vehicle (EV) charging at any given time.

18 Claims, 4 Drawing Sheets

(56) References Cited

U.S. PATENT DOCUMENTS

| | | |
|---|---|---|
| 2015/0054461 A1 | 2/2015 | Mueller et al. |
| 2015/0077054 A1 | 3/2015 | Uyeki |
| 2015/0091507 A1 | 4/2015 | Hyde et al. |
| 2015/0266389 A1 | 9/2015 | Appelbaum et al. |
| 2015/0303737 A1 | 10/2015 | Steinbuchel, IV et al. |
| 2015/0340889 A1 | 11/2015 | Appelbaum et al. |
| 2015/0346288 A1 | 12/2015 | Hardy et al. |
| 2016/0031335 A1 | 2/2016 | Soden et al. |
| 2016/0121736 A1 | 5/2016 | Jefferies et al. |
| 2016/0137079 A1 | 5/2016 | Jefferies et al. |
| 2016/0137082 A1 | 5/2016 | Jefferies et al. |
| 2016/0137087 A1* | 5/2016 | Haas ................ B60L 53/665 320/109 |
| 2016/0138980 A1 | 5/2016 | Jefferies et al. |
| 2016/0159231 A1 | 6/2016 | Jefferies et al. |
| 2016/0176306 A1 | 6/2016 | Outwater |
| 2016/0198002 A1 | 7/2016 | Penilla et al. |
| 2016/0221453 A1* | 8/2016 | Bridges ................ B60L 53/63 |
| 2016/0347191 A1 | 12/2016 | Hayashigawa et al. |
| 2017/0066340 A1 | 3/2017 | Flack |
| 2017/0197517 A1 | 7/2017 | Jamieson et al. |

\* cited by examiner

SMART LOAD MANAGEMENT APPARATUS AND SYSTEM FOR ELECTRIC VEHICLE CHARGING

RELATED APPLICATION DATA

This application is a continuation of U.S. application Ser. No. 16/354,025, filed on Mar. 14, 2019, now U.S. Pat. No. 11,091,054, which claims the benefit of U.S. Provisional Application Ser. No. 62/643,043, filed on Mar. 14, 2018, the contents of which are hereby incorporated by reference.

TECHNICAL FIELD

This disclosure relates to electric vehicle charging, and, more particularly, to house and building power monitoring and charge distribution using a smart load manager (SLM) apparatus and one or more intelligent electric vehicle supply equipment (EVSE) units.

BACKGROUND

The adoption of electric vehicles, plug-in hybrid electric vehicles, and the like, continues at a rapid pace. As the deployment of electric vehicles increases, the charging infrastructure must be adapted to meet demand Houses and buildings typically have a predetermined maximum amount of power load installed and available for use. A variety of devices draw power from the predetermined load such as lights, appliances, heating systems, air-conditioners, and the like. As electric vehicles become more widely adopted, the load that is placed on the electrical infrastructure of the house or building increases. If not properly monitored and distributed, the maximum load can be exceeded, which can cause circuits to trip, devices to malfunction, and can even result in dangerous conditions or accidents.

Because power is traditionally distributed based on the maximum total load, a need remains for improved methods and systems for increasing the number of intelligent EVSE units installed at a particular location using a smart load manager, which can provide additional capacity to the smart EVSE units when other demand on the system is low. Embodiments of the invention address these and other limitations in the prior art.

Figure 1A:
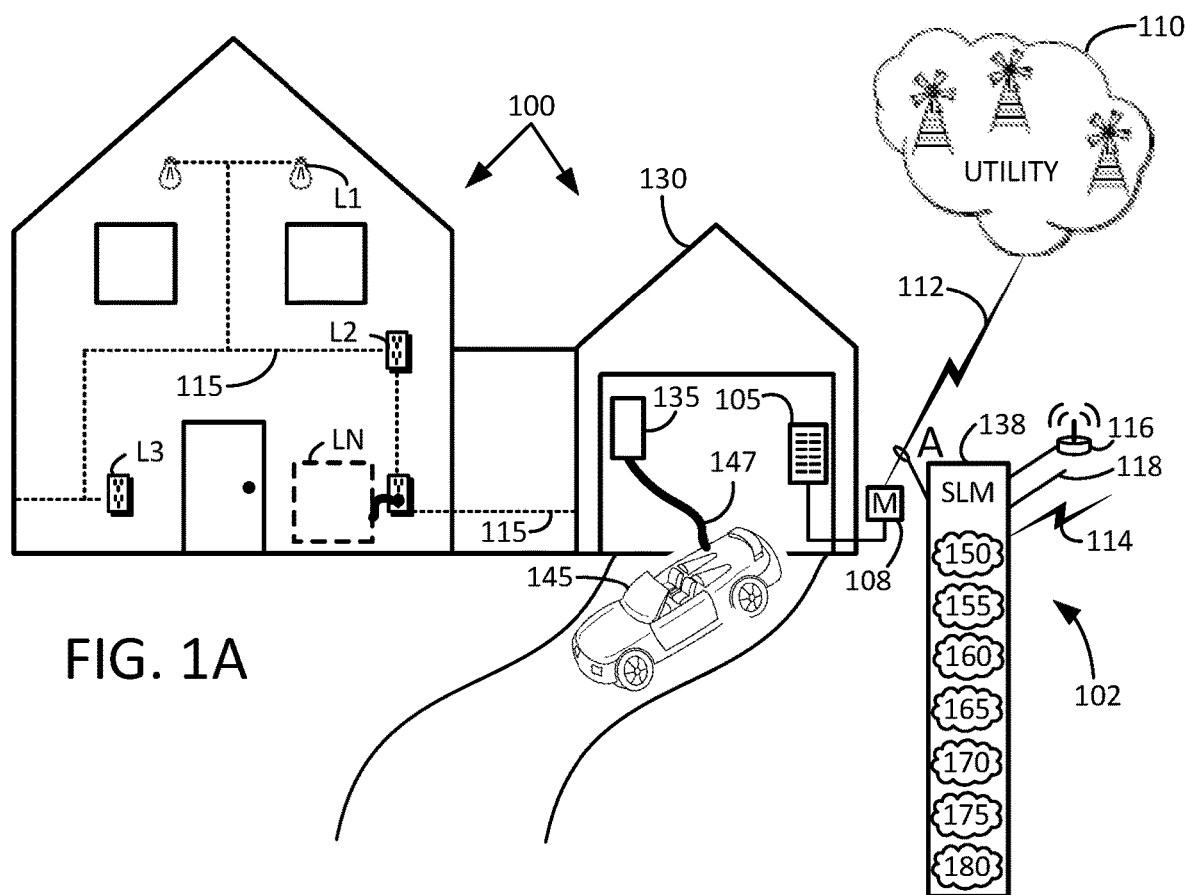
FIG. 1A illustrates a schematic diagram of a smart load balancing EV charging system installed at a house in accordance with various embodiments of the present inventive concept.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first transceiver could be termed a second transceiver, and, similarly, a second transceiver could be termed a first transceiver, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference is often made herein to "electric vehicles." It will be understood that such vehicles can include plug-in hybrid vehicles, pure electric vehicles, an electric golf cart, an electric scooter, an electric bike, an electric skateboard, a SEGWAY®, or any one of a variety of vehicles that operate or move using at least some electricity.

Embodiments of the inventive concept measure the amount of electrical power being consumed in one or more buildings, before the utility meter or meters. These measurements are used by a smart load manager (SLM) apparatus, in addition to information about the maximum capacity of the electrical lines that are being measured, to maximize the number of electric vehicle supply equipment (EVSE) units that can be installed in the one or more buildings, and maximize the amount of power that is available for electric vehicle (EV) charging at any given time.

In the case of a single family house installation, an SLM apparatus can monitor the total energy consumption of the house and communicate to one or more intelligent EVSE units the maximum amount of energy that can be consumed by one or more charging EVs. In cases where an electrical panel has existing loads that would prohibit the connection of a traditional EVSE unit (since the traditional EVSE unit, if active when other existing loads are active, could result in the total energy exceeding the panel's capacity), the SLM apparatus can nevertheless enable the installation of the intelligent EVSE unit by dynamically reducing the energy available to the EV when existing household loads are present.

In the case where the SLM apparatus is installed at an office, multi-unit dwelling, or other building with multiple utility meters, the SLM apparatus can be installed on the utility side of the meters, and can allow the installation of more intelligent EVSE units than would otherwise be possible with traditional EVSE units, by communicating the available power to the intelligent EVSE units in order to maximize EV charging rates at any given time, while reducing EV charging rates when other building loads are present. As a result, one or more intelligent EVSE units can be installed in cases where traditional EVSE units could not be installed without upgrading the amount of total power available from the utility company to the existing electric meter(s) and panel(s). Moreover, the implementation of the system disclosed herein avoids the need to upgrade electrical panels for a house or building, while still accommodating the optimum charging of one or more electric vehicles.

FIG. 1A illustrates a schematic diagram of a smart load balancing EV charging system 102 installed at a house 100 in accordance with various embodiments of the present inventive concept. In the house application as shown in FIG. 1A, an SLM apparatus 138 can be installed at location [A], on the line 112 between the electrical meter 108 and an electric utility provider 110. The SLM apparatus 138 can measure the total power consumed by the house 100 and communicate with an intelligent EVSE unit 135 to charge an EV 145 optimally based on available power. For example, the EVSE unit 135 can charge the EV 145 at a maximum rate when total consumption of loads L1, L2, L3 through LN are relatively low or otherwise less than a predefined threshold. Conversely, when the total power consumption of the loads L1, L2, L3 through LN increases and are relatively high, or otherwise above a predefined threshold, the charging rate of the EV 145 can be reduced by the intelligent EVSE unit 135 to keep the total power consumed within parameters of the electrical panel 105 and the electric utility provider 110. Reduction of EVSE charging rates can be partial or complete, depending on the power required for the other loads.

The house 100 can include a garage or car port 130. The garage or car port 130 can include the intelligent EVSE unit 135. The intelligent EVSE unit 135 can be electrically and/or communicatively coupled to the house power meter 108. For example, the intelligent EVSE unit 135 can be electrically and/or communicatively coupled to the house power meter 108 via the electrical wiring 115. Alternatively or in addition, the intelligent EVSE unit 135 can be communicatively coupled to the SLM apparatus 138 via the electrical wiring 115. Alternatively or in addition, the intelligent EVSE unit 135 can be communicatively coupled to the SLM apparatus 138 through an out-of-band communication link. For example, the intelligent EVSE unit 135 can be communicatively coupled to the SLM apparatus 138 via an out-of-band communication link such as a wireless link 116 or out-of-band wired connection 118. In some embodiments, a direct electrical connection 114 exists between the SLM apparatus 138 and the intelligent EVSE unit 135. The house power meter 108 can be electrically coupled to the electric utility provider 110 via power line 112, which can provide power for use by the house 100.

The electrical infrastructure of the house 100 can include, for example, the house power meter 108, electrical wiring 115, plug outlets L2 and L3, lighting devices L1, appliances LN, or the like. It will be understood that any number of electrical loads may exist within the house 100. It will be understood that other kinds of devices can be used such as circuit breakers, rectifiers, inverters, transformers, or the like (not shown).

The intelligent EVSE unit 135 can be electrically coupled to the electric vehicle 145 via power cord 147. The intelligent EVSE unit 135 can be communicatively coupled to the SLM apparatus 138 either wirelessly or via a wire. The intelligent EVSE unit 135 can receive an active power load value 150 by directly measuring power on line 112 and/or directly from the house power meter 105. The active power load value 150 can indicate an instantaneous power level presently being delivered to the house 100. The intelligent EVSE unit 135 can receive a maximum installed power load value 155 from the SLM apparatus 138. Alternatively or in addition, the intelligent EVSE unit 135 can be manually programmed with the maximum installed power load value 155.

The maximum installed power load value 155 can include a maximum amount of power capable of being delivered via the electrical infrastructure of the house 100. For example, if the house 100 includes ten (10) twenty (20) Amp circuits, then at one hundred twenty (120) Volts, the maximum installed power load 155 can be 24 kVA (i.e., Kilowatts). This is only a theoretical maximum since a safety buffer should exist such that the electrical infrastructure is not overloaded, which could otherwise cause a safety hazard. The SLM apparatus 138 and/or the intelligent EVSE unit 135 can automatically determine a safety buffer value 160 such as 20%. Alternatively or in addition, the SLM apparatus 138 and/or the intelligent EVSE unit 135 can be manually programmed with the safety buffer value. The SLM 138 and/or the intelligent EVSE unit 135 can automatically determine a buffer-reduced maximum installed power load value 165 by reducing the maximum installed power load value 155 by the safety buffer value 160.

The SLM apparatus 138 and/or the intelligent EVSE unit 135 can determine a real-time amount of power available for charging one or more electric vehicles 145 by periodically calculating a house-wide available power value 170. The house-wide available power value 170 can be determined as the difference between the buffer-reduced maximum installed power load value 165 and the active power load value 150. In other words, the amount of power available for charging the one or more electric vehicles 145 can be equal to or less than the buffer-reduced maximum installed power load value 165 minus the active power load value 150.

In some embodiments, the SLM apparatus 138 monitors the charging rates of the intelligent EVSE units (e.g., 135). The SLM apparatus 138 can perform its power distribution functions based at least on the charging rate information of the intelligent EVSE units. For example, by knowing the total power and each intelligent EVSE unit power, the SLM 138 can subtract to get the amount of power being consumed by non-EVSE loads. More specifically, an EVSE load power value 175 can be determined by the SLM apparatus 138, which can include the total power being delivered to the EVSE units (e.g., 135). Consequently, a non-EVSE load power value 180 can be determined by subtracting the EVSE load power value 175 from the active power load value 150.

The SLM apparatus 138 and the intelligent EVSE unit 135 can therefore safely allocate a corresponding amount of charging power to the one or more electric vehicles 145. Moreover, the SLM apparatus 138 and/or the intelligent EVSE unit 135 can periodically adjust the allocation of power to the one or more electric vehicles 145 based on changes over time in the house-wide available power value 170. As the various devices in the house 100 such as the appliances 140 and lights 125 change their power load requirements over time, so too can the SLM apparatus 138 and/or the intelligent EVSE unit 135 adjust the power allocation for charging the electric vehicle 145.

Figure 1B:
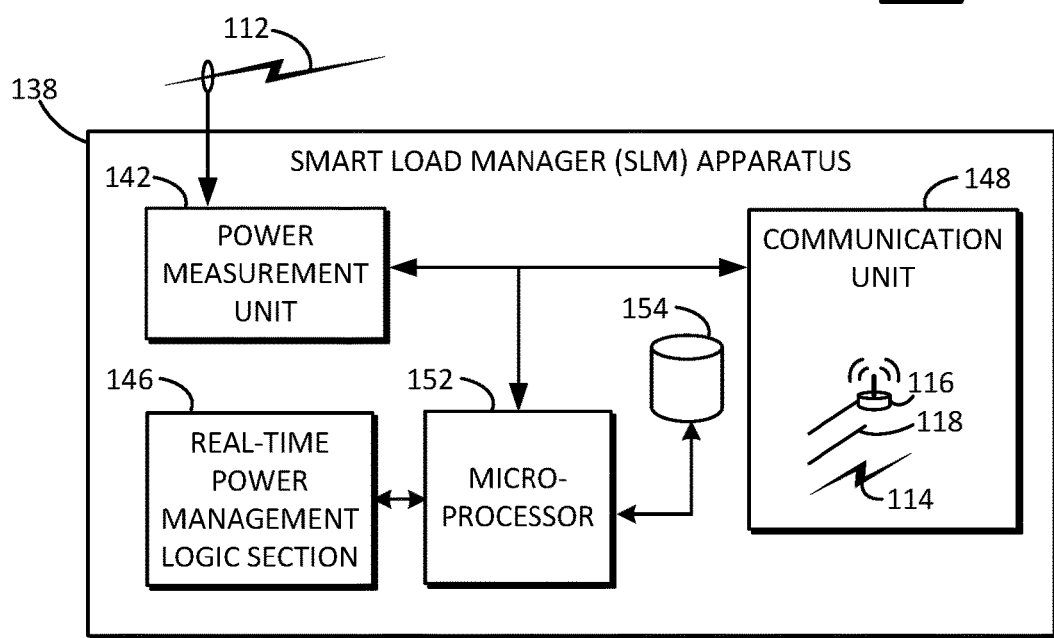
FIG. 1B illustrates a block diagram of the SLM apparatus in accordance with some embodiments of the inventive concept.

FIG. 1B illustrates a block diagram of the SLM apparatus 138 in accordance with some embodiments of the inventive concept. The SLM apparatus 138 can include a power measurement unit 142 for measuring the active power being drawn over the electrical line 112. The SLM apparatus 138 can include a real-time power management logic section 146. The real-time power management logic section 146 can generate the active power load value 150, the safety buffer value 160, the buffer-reduced maximum installed power load value 165, the house-wide available power value 170, the EVSE load power value 175, and/or the non-EVSE load power value 180. The storage device 154 can store the active power load value 150, the safety buffer value 160, the buffer-reduced maximum installed power load value 165, the house-wide available power value 170, the EVSE load power value 175, and/or the non-EVSE load power value 180.

The SLM apparatus 138 can include a communication unit 148. The communication unit 148 can transmit, for example, the active power load value 150 to the intelligent EVSE unit 135 via a wireless transceiver 116, an out-of-band wired connection 118, and/or over a direct electrical connection 114. Accordingly, the intelligent EVSE unit 135 can charge the EV 145 optimally based on the active power load value 150. In some embodiments, the intelligent EVSE unit 135 can transmit at least one of the active power load value 150, the safety buffer value 160, the buffer-reduced maximum installed power load value 165, the house-wide available power value 170, the EVSE load power value 175, or the non-EVSE load power value 180. Accordingly, the intelligent EVSE unit 135 can charge the EV 145 optimally based on at least one of the active power load value 150, the safety buffer value 160, the buffer-reduced maximum installed power load value 165, the house-wide available power value 170, the EVSE load power value 175, or the non-EVSE load power value 180.

The SLM apparatus 138 can include a microprocessor 152 and a storage device 154. The microprocessor 152 can execute logic associated with the real-time power management logic section 146. The storage device 154 can store one or more parameters associated with the SLM 138. For example, the storage device 154 can store the active power load value (e.g., 150), the safety buffer value (e.g., 160), the buffer-reduced maximum installed power load value (e.g., 165), the house-wide (or building-wide) available power value (e.g., 170), the EVSE load power value (e.g., 175), and/or the non-EVSE load power value (e.g., 180). The storage device 154 can be a volatile storage device such as a DRAM memory chip. Alternatively or in addition, the storage device 154 can be a non-volatile storage device such as a flash memory chip, a solid state drive (SSD), a magnetic storage device, an optical storage device, or the like. The microprocessor 152 can coordinate the functions of the power measurement unit 142, the communication unit 148, the real-time management logic section 146, and/or the storage device 154.

Figure 1C:
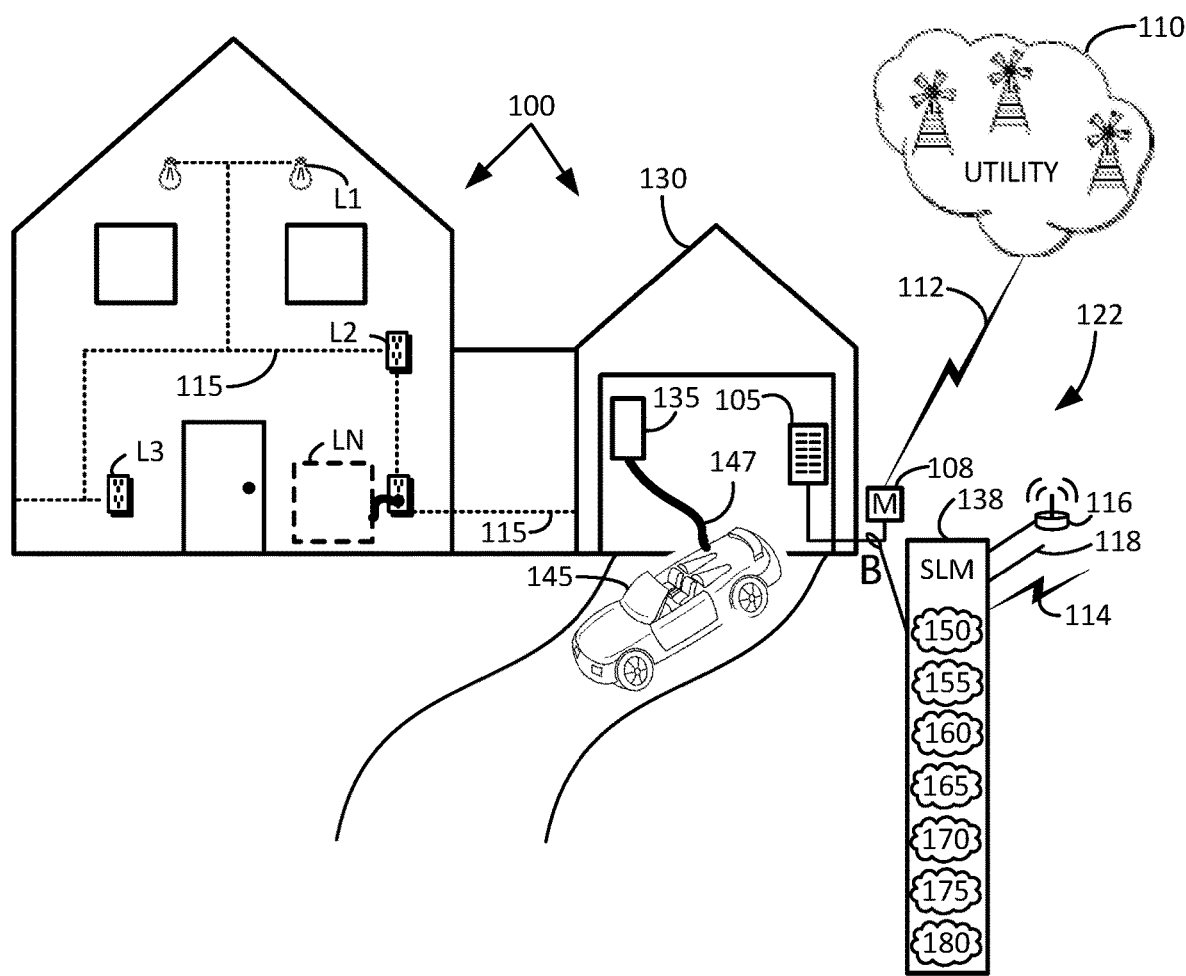
FIG. 1C illustrates a schematic diagram of a smart load balancing EV charging system installed at a house in accordance with various embodiments of the present inventive concept.

FIG. 1C illustrates a schematic diagram of a smart load balancing EV charging system 122 installed at a house 100 in accordance with various embodiments of the present inventive concept. The notable difference between this system 122 and the system 102 of FIG. 1A, is that the SLM apparatus 138 is installed at location [B], between the house 100 and the electrical meter 108. Otherwise, the function and operation of the SLM apparatus 138 and other components of the system 122 are similar to or the same as those described above with reference to FIG. 1A. Therefore, a detailed description of such is not repeated.

Figure 1D:
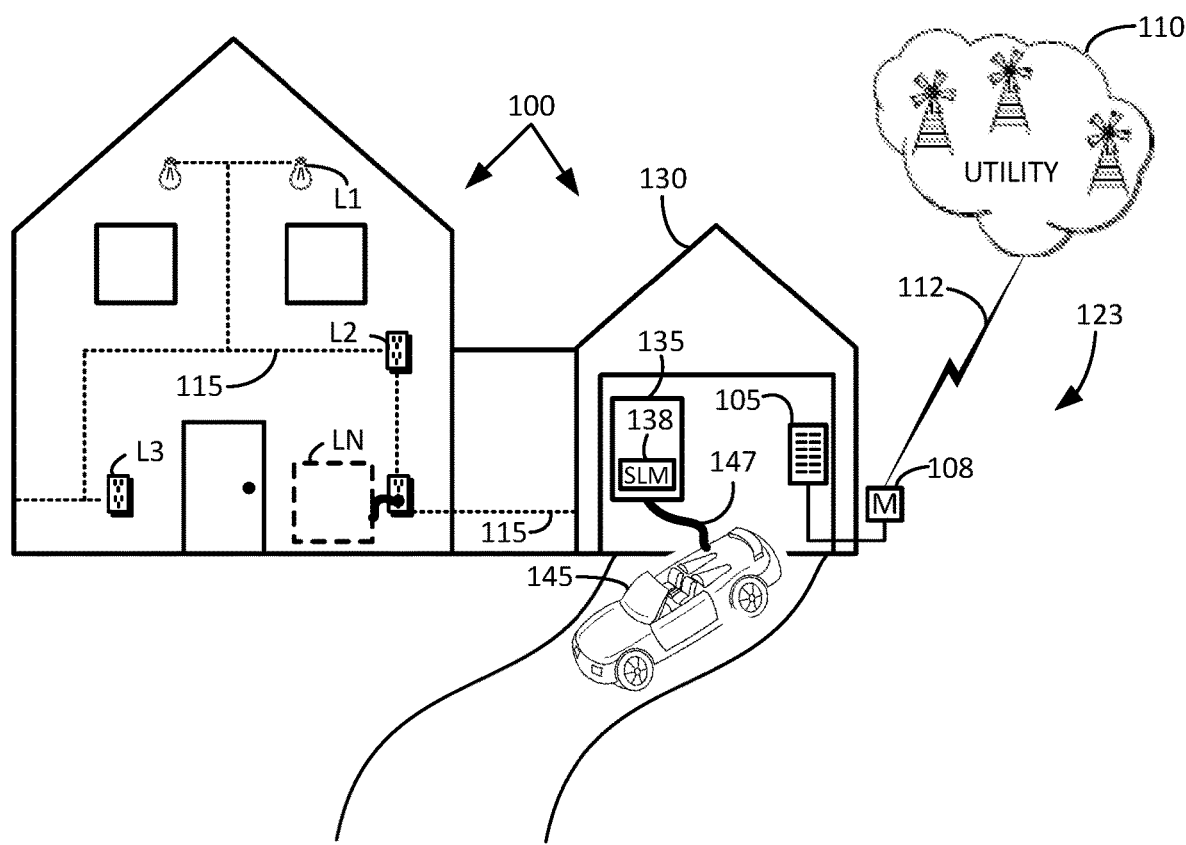
FIG. 1D illustrates a schematic diagram of a smart load balancing EV charging system installed at a house, and which includes the SLM apparatus within the EVSE unit, in accordance with various embodiments of the present inventive concept.

FIG. 1D illustrates a schematic diagram of a smart load balancing EV charging system 123 installed at a house, and which includes the SLM apparatus 138 within the EVSE unit 135, in accordance with various embodiments of the present inventive concept. The notable difference between this system 123 and the system 102 of FIG. 1A, is that the SLM apparatus 138 is installed in the same box as the EVSE unit 135. The SLM apparatus 138 can still measure the power, between the house 100 and the electrical meter 108 as shown in FIG. 1C, or between the meter 108 and the utility 110 as shown in FIG. 1A. Since both the SLM apparatus 138 and the EVSE unit 135 are part of the same box, there need not be a wireless communication between the two. Otherwise, the function and operation of the SLM apparatus 138 and other components of the system 122 are similar to or the same as those described above with reference to FIG. 1A. Therefore, a detailed description of such is not repeated.

Figure 2:
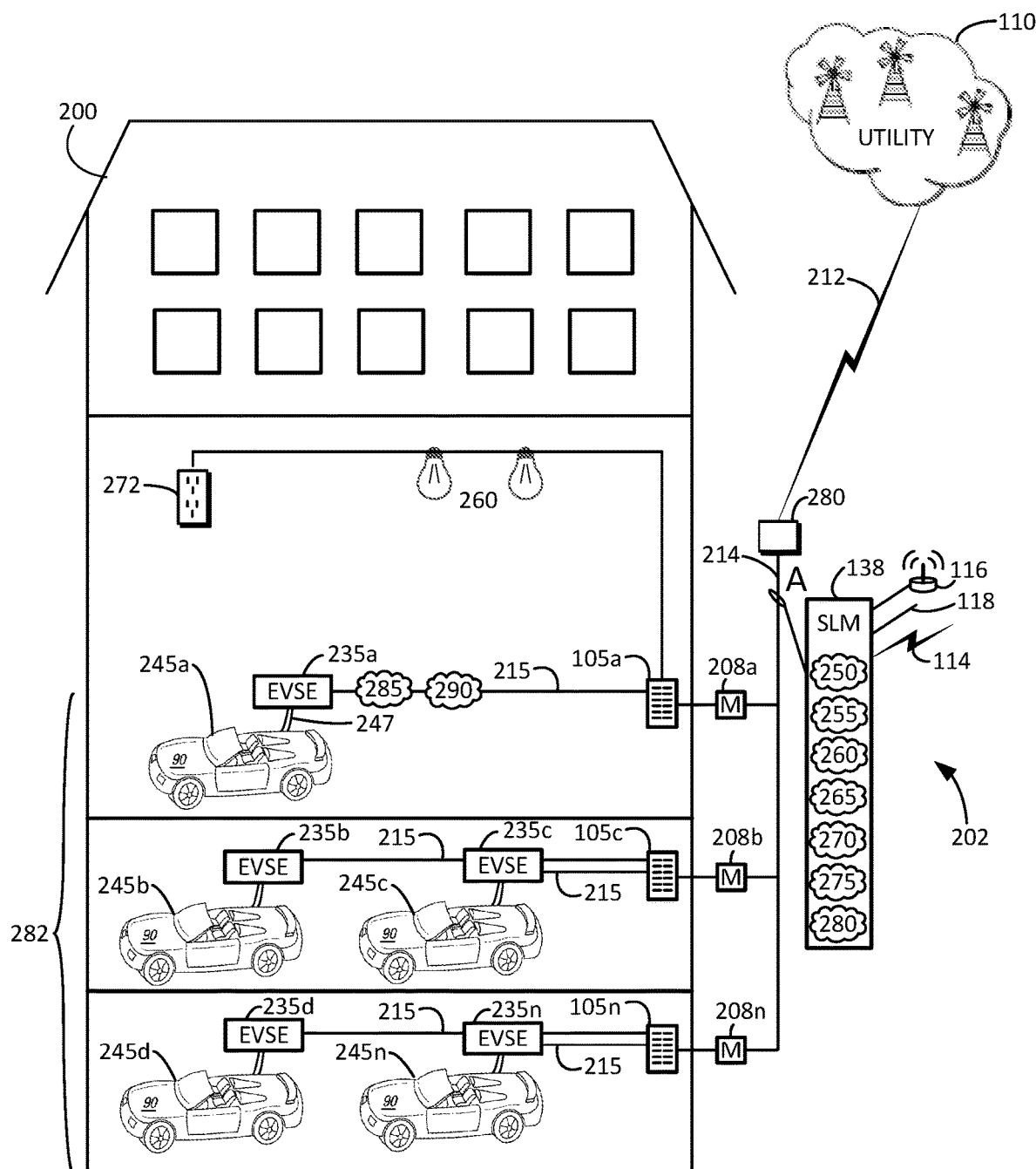
FIG. 2 illustrates a schematic diagram of a smart load balancing EV charging system installed at a building in accordance with various embodiments of the present inventive concept.

FIG. 2 illustrates a schematic diagram of a smart load balancing EV charging system 202 installed at a building 200 in accordance with various embodiments of the present inventive concept. The building 200 can be, for example, an apartment complex, a parking garage, a commercial building, or the like. In the building application as shown in FIG. 2, an SLM apparatus 138 can measure total power consumed by all meters 208a through 208n and communicate with the intelligent EVSE units 235a through 235n to charge EVs 282 (i.e., 245a through 245n, respectively) optimally based on available power. For example, the intelligent EVSE units 235a through 235n can charge the EVs 245a through 245n at a maximum rate when total power consumption of loads (e.g., 260 and 272) of the building 200 is relatively low or otherwise below a predefined threshold. Conversely, when the total power consumption of the loads (e.g., 260 and 272) of the building 200 increases or is otherwise above a predefined threshold, the charging rate of the EVs 282 can be reduced by the intelligent EVSE units 235a through 235n to keep the total power consumed within parameters of electrical panels 105a through 105n and the electric utility provider 110. Each of the electrical panels can include, for example, a plurality of circuit breakers, switches, wires, or other suitable electrical components.

The SLM 138 can be installed at location [A], on the line 214 between the electrical meters 208a through 208n and the electric utility provider 110. The location [A] where the SLM 138 is installed can be after the utility drop 280 (e.g., after the transformer), but before the various meters 208a through 208n associated with the building 200.

The building 200 can include the intelligent EVSE units 235a through 235n. Alternatively or in addition, the intelligent EVSE units 235a through 235n can be located outside of the building 200 but nearby. The intelligent EVSE units 235a through 235n can each be electrically and/or communicatively coupled to a corresponding electrical panel (e.g., 105a through 105n) and meter (e.g., 208a through 208n). Alternatively or in addition, the intelligent EVSE units 235a through 235n can be communicatively coupled to the SLM apparatus 138 via the electrical wiring 215. Alternatively or in addition, the intelligent EVSE units 235a through 235n can be communicatively coupled to the SLM apparatus 138 through an out-of-band communication link. For example, the intelligent EVSE units 235a through 235n can be communicatively coupled to the SLM apparatus 138 via an out-of-band communication link such as a wireless link 116 or out-of-band wired connection 118. In some embodiments, a direct electrical connection 114 exists between the SLM apparatus 138 and the intelligent EVSE units 235a through 235n. The meters 208a through 208n can be electrically coupled to the electric utility provider 110 via power lines 212 and 214. The electric utility provider 110 can generate power for use by the building 200.

The electrical infrastructure of the building 200 can include, for example, the power meters 208a through 208n, the electrical wiring (e.g., 215), plug outlets (e.g., 272) and lighting devices (e.g., 260), or the like. It will be understood that any number of electrical loads may exist within the building 200. It will be understood that other kinds of devices can be used such as circuit breakers, rectifiers, inverters, transformers, or the like (not shown).

The intelligent EVSE units 235a through 235n can be electrically coupled to the EVs 245a through 245n via corresponding power cords (e.g., 247). The intelligent EVSE units 235a through 235n can be communicatively coupled to the SLM apparatus 138 either wirelessly or via a wire. The intelligent EVSE units 235a through 235n can receive an active power load value 250, or portion thereof, by directly measuring power on line 214. The active power load value 250 can indicate an instantaneous power level presently being delivered to the building 200. In some embodiments, the SLM apparatus 138 can measure or determine the active power load value 250. The intelligent EVSE units 235a through 235n can each receive a maximum installed power load value 255 from the SLM apparatus 138. Alternatively or in addition, the intelligent EVSE units 235a through 235n can be manually programmed with the maximum installed power load value 255.

The maximum installed power load value 255 can include a maximum amount of power capable of being delivered via the electrical infrastructure of the building 200. For example, if the building 200 includes one hundred (100) twenty (20) Amp circuits, then at one hundred twenty (120) Volts, the maximum installed power load 255 can be 240 kVA (i.e., Kilowatts). This is only a theoretical maximum since a safety buffer should exist such that the electrical infrastructure is not overloaded, which could otherwise cause a safety hazard. The SLM apparatus 138 and/or the intelligent EVSE units 235a through 235n can automatically determine a safety buffer value 260 such as 20%. Alternatively or in addition, the SLM apparatus 138 and/or the intelligent EVSE units 235a through 235n can be manually programmed with the safety buffer value 260. The SLM apparatus 138 and/or the intelligent EVSE units 235a through 235n can automatically determine a buffer-reduced maximum installed power load value 265 by reducing the maximum installed power load value 255 by the safety buffer value 260.

The SLM apparatus 138 and/or the intelligent EVSE units 235a through 235n can determine a real-time amount of power available for charging one or more electric vehicles 245a through 245n by periodically calculating a building-wide available power value 270. The building-wide available power value 270 can be determined as the difference between the buffer-reduced maximum installed power load value 265 and the active power load value 250. In other words, the amount of power available for charging the one or more electric vehicles 245a through 245n can be equal to or less than the buffer-reduced maximum installed power load value 265 minus the active power load value 250. In some embodiments, a buffer-reduced maximum installed power load value 265 can be calculated for each separate meter (e.g., 208a through 208n). In some embodiments, a buffer-reduced maximum installed power load value 265 can be calculated for each separate electrical panel (e.g., 105a through 105n).

In some embodiments, the SLM apparatus 138 monitors the charging rates of the intelligent EVSE units (e.g., 235a through 235n). The SLM apparatus 138 can perform its power distribution functions based at least on the charging rate information of the intelligent EVSE units (e.g., 235a through 235n). For example, by knowing the total power and each intelligent EVSE unit power, the SLM apparatus 138 can subtract to get the amount of power being consumed by non-EVSE loads. More specifically, an EVSE load power value 275 can be determined by the SLM apparatus 138, which can include the total power being delivered to the EVSE units (e.g., 235a through 235n). Consequently, a non-EVSE load power value 280 can be determined by subtracting the EVSE load power value 275 from the active power load value 250.

The SLM apparatus 138 and the intelligent EVSE units 235a through 235n can therefore safely allocate a corresponding amount of charging power to the one or more electric vehicles 245a through 245n. Moreover, the intelligent EVSE units 235a through 235n can periodically adjust the allocation of power to the one or more electric vehicles 245a through 245n based on changes over time in the building-wide available power value 270. As the various devices in the building 200 such as the lights 260 and outlets 272 change their power load requirements over time, so too can the SLM apparatus 138 and/or the intelligent EVSE units 235a through 235n adjust the power allocation for charging each of the electric vehicles 245a through 245n.

The intelligent EVSE units 235a through 235n can be provided with a specific allocation of charging power from the SLM apparatus 138, which can include a baseline amount of power 285 that is always available, and a bonus amount of power 290. The baseline amount of power 285 and/or the bonus amount of power 290 can be changed dynamically by the SLM apparatus 138 based on the building's overall load. In the case of a communications failure with the SLM apparatus 138—for example, if there is no communication received from the SLM apparatus 138 for a specific, predefined amount of time—the intelligent EVSE units 235a through 235n can automatically reduce their output down to the baseline power level 285. This allows the system to continue operating within the parameters of the building's power limitations even if there is a failure of the SLM apparatus 138, the communication link between the SLM 138 and one or more of the intelligent EVSE units 235a through 235n, or the like.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Some embodiments include a smart load manager (SLM) apparatus for electric vehicle charging. The SLM apparatus can include a communication unit configured to communicate with one or more electric vehicle supply equipment (EVSE) units. The SLM apparatus can include a power measurement unit configured to measure an active power load value being drawn over an electrical line, wherein the power measurement unit is configured to measure the active power load value at a location between an electrical meter of at least one of a house or a building, and an electric utility provider. The SLM apparatus can include a real-time power management logic section configured to periodically calculate at least one of a house-wide available power value or a building-wide available power value dependent on the active power load value. In some embodiments, the real-time power management logic section is configured to power load balance the one or more EVSE units dependent on the at least one of the house-wide available power value or the building-wide available power value.

In some embodiments, the real-time power management logic section is configured to cause to be stored a maximum installed power load value for the at least one of the house or the building. In some embodiments, the real-time power management logic section is configured to determine the at least one of the house-wide available power value or the building-wide available power value by subtracting the active power load value from the maximum installed power load value.

In some embodiments, the real-time power management logic section is configured to cause to be stored a maximum installed power load value for the at least one of the house or the building. In some embodiments, the real-time power management logic section is configured to determine a buffer-reduced maximum installed power load value by subtracting a safety buffer value from the active power load value. In some embodiments, the real-time power management logic section is configured to determine the at least one of the house-wide available power value or the building-wide available power value by subtracting the active power load value from the buffer-reduced maximum installed power load value.

In some embodiments, the real-time power management logic section is configured to determine an EVSE load power value for each of the one or more EVSE units. In some embodiments, the real-time power management logic section is configured to control the EVSE load power value for each of the one or more EVSE units dependent on the at least one of the house-wide available power value or the building-wide available power value.

In some embodiments, the real-time power management logic section is configured to determine a non-EVSE load power value by subtracting the EVSE load power value for all of the one or more EVSE units from the active power load value. In some embodiments, the real-time power management logic section is configured to power load balance the one or more EVSE units dependent on the non-EVSE load power value.

In some embodiments, the real-time power management logic section is configured to periodically adjust an allocation of power to the one or more EVSE units dependent on changes over time in the non-EVSE load power value.

Some embodiments of the SLM apparatus include a storage device. In some embodiments, the storage device is configured to store at least one of the active power load value, the house-wide available power value, the building-wide available power value, the maximum installed power load value, the safety buffer value, the buffer-reduced maximum installed power load value, the non-EVSE load power value, or the non-EVSE load power value.

In some embodiments, the storage device is configured to store all of the active power load value, the maximum installed power load value, the safety buffer value, the buffer-reduced maximum installed power load value, and the EVSE load power value.

In some embodiments, the communication unit is communicatively coupled to the one or more EVSE units via an electrical wiring. In some embodiments, the communication unit is communicatively coupled to the one or more EVSE units via at least one of an out-of-band wireless communication link or an out-of-band wired communication link. In some embodiments, the real-time power management logic section is configured to monitor a charging rate of the one or more EVSE units, and to cause the one or more EVSE units to be power load balanced dependent on the charging rate of the one or more EVSE units.

Some embodiments include a computer-implemented method for electric vehicle charging. The method can include communicating, by a smart load manager, with one or more electric vehicle supply equipment (EVSE) units. The method can include measuring, by a power measurement unit of the smart load manager, an active power load value being drawn over an electrical line, at a location between an electrical meter of at least one of a house or a building, and an electric utility provider. The method can include periodically calculating, by a real-time power management logic section of the smart load manager, at least one of a house-wide available power value or a building-wide available power value dependent on the active power load value. The method can include load balancing, by the smart load manager, the one or more EVSE units dependent on the at least one of the house-wide available power value or the building-wide available power value.

In some embodiments, the method includes causing to be stored, by the real-time power management logic section, a maximum installed power load value for the at least one of the house or the building. The method can include determining, by the real-time power management logic section, the at least one of the house-wide available power value or the building-wide available power value by subtracting the active power load value from the maximum installed power load value.

In some embodiments, the method can include causing to be stored, by the real-time power management logic section, a maximum installed power load value for the at least one of the house or the building. The method can include determining, by the real-time power management logic section, a buffer-reduced maximum installed power load value by subtracting a safety buffer value from the active power load value. The method can include determining, by the real-time power management logic section, the at least one of the house-wide available power value or the building-wide available power value by subtracting the active power load value from the buffer-reduced maximum installed power load value.

Some embodiments of the method can include determining, by the real-time power management logic section, an EVSE load power value for each of the one or more EVSE units. The method can include controlling, by the real-time power management logic section, the EVSE load power value for each of the one or more EVSE units dependent on the at least one of the house-wide available power value or the building-wide available power value.

Some embodiments of the method can include determining, by the real-time power management logic section, a non-EVSE load power value by subtracting the EVSE load power value for all of the one or more EVSE units from the active power load value. The method can include load balancing, by the real-time power management logic section, the amount of power available to the one or more EVSE units dependent on the non-EVSE load power value. The method can include periodically adjusting, by the real-time power management logic section, an allocation of power to the one or more EVSE units dependent on changes over time in the non-EVSE load power value. The method can include storing, by a storage device of the smart load manager, at least one of the active power load value, the house-wide available power value, the building-wide available power value, the maximum installed power load value, the safety buffer value, the buffer-reduced maximum installed power load value, the non-EVSE load power value, or the non-EVSE load power value.

In some embodiments, the method can include storing, by a storage device of the smart load manager, all of the active power load value, the maximum installed power load value, the safety buffer value, the buffer-reduced maximum installed power load value, and the EVSE load power value.

Some embodiments include a system for charging one or more electric vehicles. The system can include one or more electric vehicle supply equipment (EVSE) units. The system can further include an SLM apparatus. The SLM apparatus can include a communication unit configured to communicate with the one or more EVSE units. The SLM apparatus can include a power measurement unit configured to measure an active power load value being drawn over an electrical line, wherein the power measurement unit is configured to measure the active power load value at a location between an electrical meter of at least one of a house or a building, and an electric utility provider. The SLM apparatus can include a real-time power management logic section configured to periodically calculate at least one of a house-wide available power value or a building-wide available power value dependent on the active power load value.

In some embodiments, the real-time power management logic section is configured to cause to be stored a maximum installed power load value for the at least one of the house or the building. In some embodiments, the real-time power management logic section is configured to determine a buffer-reduced maximum installed power load value by subtracting a safety buffer value from the active power load value. In some embodiments, the real-time power management logic section is configured to determine the at least one of the house-wide available power value or the building-wide available power value by subtracting the active power load value from the buffer-reduced maximum installed power load value. In some embodiments, the real-time power management logic section is configured to power load balance the one or more EVSE units dependent on the at least one of the house-wide available power value or the building-wide available power value.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format.

Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A smart load manager apparatus for electric vehicle charging, the apparatus comprising:
    a communication unit configured to communicate with one or more electric vehicle supply equipment (EVSE) units;
    a power measurement unit coupled to the communication unit, and configured to measure an active power load value being drawn over an electrical line, wherein the power measurement unit is configured to measure the active power load value at a location between an electrical meter of at least one of a house or a building, and an electric utility provider, and wherein the power measurement unit is installed at a location between the electrical meter of the at least one of the house or the building, and the electric utility provider;
    a microprocessor coupled to the communication unit and the power management unit;
    a storage device coupled to the microprocessor; and
    a real-time power management logic section coupled to the microprocessor, and configured to periodically calculate at least one of a house-wide available power value or a building-wide available power value dependent on the active power load value,
    wherein the microprocessor is configured to cause the communication unit to communicate with the one or more EVSE units dependent on the active power load value being drawn over the electrical line;
    wherein the microprocessor is configured to execute logic associated with the real-time power management logic section; and
    wherein the real-time power management logic section is configured to cause to be stored by the storage device a maximum installed power load value for the at least one of the house or the building.

2. The smart load manager apparatus for electric vehicle charging of claim 1, wherein:
    the real-time power management logic section is configured to determine the at least one of the house-wide available power value or the building-wide available power value by subtracting the active power load value from the maximum installed power load value.

3. The smart load manager apparatus for electric vehicle charging of claim 2, wherein the real-time power management logic section is configured to power load balance the one or more EVSE units using the communication unit dependent on the at least one of the house-wide available power value or the building-wide available power value.

4. The smart load manager apparatus for electric vehicle charging of claim 1, wherein the real-time power management logic section is configured to determine a buffer-reduced maximum installed power load value by subtracting a safety buffer value from the active power load value.

5. The smart load manager apparatus for electric vehicle charging of claim 4, wherein the real-time power management logic section is configured to determine the at least one of the house-wide available power value or the building-wide available power value by subtracting the active power load value from the buffer-reduced maximum installed power load value.

6. The smart load manager apparatus for electric vehicle charging of claim 1, wherein:
    the real-time power management logic section is configured to determine an EVSE load power value for each of the one or more EVSE units; and
    the real-time power management logic section is configured to control the EVSE load power value for each of the one or more EVSE units dependent on the at least one of the house-wide available power value or the building-wide available power value.

7. The smart load manager apparatus for electric vehicle charging of claim 6, wherein:
    the real-time power management logic section is configured to determine a non-EVSE load power value by subtracting the EVSE load power value for all of the one or more EVSE units from the active power load value; and
    the real-time power management logic section is configured to power load balance the one or more EVSE units dependent on the non-EVSE load power value.

8. The smart load manager apparatus for electric vehicle charging of claim 7, wherein the real-time power management logic section is configured to periodically adjust an allocation of power to the one or more EVSE units dependent on changes over time in the non-EVSE load power value.

9. The smart load manager apparatus for electric vehicle charging of claim 1, wherein the communication unit is communicatively coupled to the one or more EVSE units via an electrical wiring.

10. The smart load manager apparatus for electric vehicle charging of claim 1, wherein the communication unit is communicatively coupled to the one or more EVSE units via at least one of an out-of-band wireless communication link or an out-of-band wired communication link.

11. A computer-implemented method for electric vehicle charging, the method comprising:
    installing a power measurement unit at a location between an electrical meter of at least one of a house or a building, and an electric utility provider;
    measuring, by the power measurement unit, an active power load value being drawn over an electrical line, wherein measuring includes measuring the active power load value at a location between the electrical meter of the at least one of the house or the building, and the electric utility provider;

communicating, by a communication unit, with one or more electric vehicle supply equipment (EVSE) units;

causing, by a microprocessor that is coupled to the communication unit and the power management unit, the communication unit to communicate with the one or more EVSE units dependent on the active power load value being drawn over the electrical line;

periodically calculating, by a real-time power management logic section that is coupled to the microprocessor, at least one of a house-wide available power value or a building-wide available power value dependent on the active power load value;

executing, by the microprocessor, logic associated with the real-time power management logic section; and causing to be stored, by the real-time power management logic section, in a storage device, a maximum installed power load value for the at least one of the house or the building.

12. The method of claim 11, further comprising:
determining, by the real-time power management logic section, the at least one of the house-wide available power value or the building-wide available power value by subtracting the active power load value from the maximum installed power load value.

13. The method of claim 11, further comprising power load balancing, by the real-time power management logic section, the one or more EVSE units using the communication unit dependent on the at least one of the house-wide available power value or the building-wide available power value.

14. The method of claim 11, further comprising determining, by the real-time power management logic section, a buffer-reduced maximum installed power load value by subtracting a safety buffer value from the active power load value.

15. The method of claim 14, further comprising determining, by the real-time power management logic section, at least one of the house-wide available power value or the building-wide available power value by subtracting the active power load value from the buffer-reduced maximum installed power load value.

16. The method of claim 11, further comprising:
determining, by the real-time power management logic section, an EVSE load power value for each of the one or more EVSE units; and controlling, by the real-time power management logic section, the EVSE load power value for each of the one or more EVSE units dependent on the at least one of the house-wide available power value or the building-wide available power value.

17. The method of claim 16, further comprising:
determining, by the real-time power management logic section, a non-EVSE load power value by subtracting the EVSE load power value for all of the one or more EVSE units from the active power load value; and power load balancing, by the real-time power management logic section, the one or more EVSE units dependent on the non-EVSE load power value.

18. The method of claim 17, further comprising periodically adjusting, by the real-time power management logic section, an allocation of power to the one or more EVSE units dependent on changes over time in the non-EVSE load power value.

* * * * *